UNITED STATES PATENT OFFICE.

ARTHUR HEINEMANN, OF WEST KENSINGTON, LONDON, ENGLAND.

MANUFACTURE OF SYNTHETIC CAOUTCHOUC.

1,194,839.  Specification of Letters Patent.  Patented Aug. 15, 1916.

No Drawing.  Application filed August 9, 1913. Serial No. 783,877.

*To all whom it may concern:*

Be it known that I, ARTHUR HEINEMANN, a subject of the King of Prussia, residing at 223 North End road, West Kensington, London, England, have invented new and useful Improvements Relating to the Manufacture of Synthetic Caoutchouc, of which the following is a specification.

When isoprene, especially impure isoprene, is polymerized products are formed which though analogous to caoutchouc are not real caoutchouc, as they are of lower molecular weight. The presence of these caoutchouc-like products prevents the drying of the real caoutchouc, causing it to remain sticky.

I will explain what I mean by the terms real caoutchouc and caoutchouc-like products. By real caoutchouc I mean a substance which has the same properties, physical as well as chemical, as purified natural caoutchouc, i. e., caoutchouc which has been freed from resins, albumin and other impurities by repeated precipitation (from a chloroform or benzol solution by means of alcohol). The other products obtained by the polymerization of isoprene, which I term caoutchouc-like products, are substances having lower degrees of polymerization than real caoutchouc, that is to say although said caoutchouc-like products have the same formula, namely $C_{10}H_{16}$, as real caoutchouc, they possess a smaller number of molecules and are consequently physically different, which of course results in a chemical difference, as to solubility, etc. These caoutchouc-like substances are mostly very soft and sticky, and consequently, as already stated, their presence prevents the drying of the real caoutchouc, causing it to remain sticky. Said caoutchouc-like products are not distilled when subjected to the action of steam and they are soluble in benzene and insoluble in alcohol or acetone. Consequently the removal of these undesirable products can not be effected by distillation, by steam or by the use of the above named reagents. I have discovered that these caoutchouc-like products readily dissolve in ethyl acetate, while the real caoutchouc is not dissolved if the ethyl acetate is in excess.

My invention consists of the utilization in the manufacture of caoutchouc from isoprene of the above referred to dissolving actions of different quantities of ethyl acetate.

My invention may be carried out in the following ways. According to one method of procedure polymerized isoprene is first freed from unconverted isoprene and liquid hydrocarbons by treatment with steam. The mixture of caoutchouc and caoutchouc-like substances resulting from this treatment is then mixed with ethyl acetate sufficient in quantity to dissolve only the products which are not caoutchouc. The quantity of acetate employed must be in excess of that which would allow of both the caoutchouc and caoutchouc-like products being dissolved. The quantity of ethyl acetate which should be used is determined by a preliminary test of a small part of the mixture of caoutchouc and caoutchouc-like substances to be treated. A similar preliminary test is likewise adopted in the case of the other methods of procedure now to be described.

According to a second method of procedure the unconverted isoprene and liquid hydrocarbons boiling below 100° C. remaining after polymerization of isoprene are removed from the polymerized product by heating. To the resulting viscous liquid, which consists of real caoutchouc and caoutchouc-like substances, both dissolved in dipentene, ethyl acetate is slowly added until the whole of the real caoutchouc is precipitated.

According to a third method of procedure the proper quantity of ethyl acetate is added to the isoprene before polymerization, so that real caoutchouc in solid form remains at the end of the polymerization process, for the caoutchouc-like substances are dissolved as they form and the real caoutchouc is precipitated.

The caoutchouc purified in the above described ways is treated with steam to remove the ethyl acetate, and the last traces of the acetate are decomposed by the addition of a suitable alkali.

Having now described my invention what I have invented and desire to secure by Letters Patent of the United States is as follows:—

1. An improvement in the manufacture of synthetic caoutchouc from isoprene consisting in polymerizing the isoprene to produce real caoutchouc and caoutchouc-like substances, and dissolving the caoutchouc-like substances by the use of ethyl acetate, substantially as and for the purpose described.

2. An improvement in the manufacture of synthetic caoutchouc from isoprene by polymerization, consisting in first polymerizing the isoprene and then adding to the polymerized product ethyl acetate in sufficient quantity to dissolve the caoutchouc-like substances which are not real caoutchouc and to precipitate the real caoutchouc, substantially as and for the purpose described.

In testimony whereof I have signed my name to this specification in the presence of two subscribing witnesses.

ARTHUR HEINEMANN.

Witnesses:
C. F. ENNIS,
HERBERT D. JAMESON.